United States Patent
Li

(10) Patent No.: US 12,277,892 B2
(45) Date of Patent: Apr. 15, 2025

(54) TEXTURE RECOGNITION DEVICE AND DISPLAY APPARATUS

(71) Applicants: BEIJING BOE SENSOR TECHNOLOGY CO., LTD., Beijing (CN); BOE TECHNOLOGY GROUP CO., LTD., Beijing (CN)

(72) Inventor: Zhonghuan Li, Beijing (CN)

(73) Assignees: BEIJING BOE SENSOR TECHNOLOGY CO., LTD., Beijing (CN); BOE TECHNOLOGY GROUP CO., LTD, Beijing (CN)

( * ) Notice: Subject to any disclaimer, the term of this patent is extended or adjusted under 35 U.S.C. 154(b) by 0 days.

(21) Appl. No.: 17/784,706

(22) PCT Filed: Jun. 22, 2021

(86) PCT No.: PCT/CN2021/101561
§ 371 (c)(1),
(2) Date: Jun. 13, 2022

(87) PCT Pub. No.: WO2022/266846
PCT Pub. Date: Dec. 29, 2022

(65) Prior Publication Data
US 2024/0185765 A1    Jun. 6, 2024

(51) Int. Cl.
*G09G 3/22*    (2006.01)
*G06V 40/12*    (2022.01)
*G06V 40/13*    (2022.01)

(52) U.S. Cl.
CPC ........... *G09G 3/22* (2013.01); *G06V 40/1318* (2022.01); *G06V 40/1341* (2022.01)

(58) Field of Classification Search
None
See application file for complete search history.

(56) References Cited

U.S. PATENT DOCUMENTS 8,665,357 B2 * 3/2014 Ishiguro ............ H01L 27/14627
348/340
11,275,922 B2    3/2022 Du
(Continued)

FOREIGN PATENT DOCUMENTS

| CN | 110023956 A | * | 7/2019 | ........... G06K 9/0004 |
| CN | 110348309 A | | 10/2019 | |

(Continued)

*Primary Examiner* — Benjamin X Casarez
(74) *Attorney, Agent, or Firm* — Dilworth & Barrese, LLP.; Michael J. Musella, Esq.

(57) ABSTRACT

A texture recognition device and a display apparatus are provided. The texture recognition device has a plurality of pixel units, and includes a base substrate, a driving circuit layer, a photosensitive element layer, and a lens layer. The driving circuit layer and the photosensitive element layer are on the base substrate, and the lens layer is on a side of the photosensitive element layer away from the base substrate; at least one pixel unit includes a pixel driving circuit in the driving circuit layer, a plurality of photosensitive elements in the photosensitive element layer and a plurality of lens units in the lens layer, the pixel driving circuit is electrically connected with the plurality of photosensitive elements, and in a direction perpendicular to a surface of the base substrate, the plurality of photosensitive elements are in one-to-one correspondence with and overlap with the plurality of lens units.

20 Claims, 9 Drawing Sheets

(56) References Cited

U.S. PATENT DOCUMENTS

| | | | | |
|---|---|---|---|---|
| 11,417,143 B2* | 8/2022 | Jiang | ................ | G06V 40/1312 |
| 2010/0067757 A1* | 3/2010 | Arai | ................ | G06V 40/1318 |
| | | | | 382/128 |
| 2019/0050621 A1* | 2/2019 | Xu | ................ | G06V 40/1318 |
| 2020/0226342 A1* | 7/2020 | Lin | ................ | G06V 40/1318 |
| 2020/0293738 A1 | 9/2020 | Zhang et al. | | |
| 2021/0133423 A1* | 5/2021 | Zhang | ................ | G02F 1/136209 |
| 2021/0319199 A1* | 10/2021 | Jiang | ................ | G06V 40/1318 |
| 2021/0409581 A1* | 12/2021 | Hai | ................ | G02F 1/133526 |
| 2022/0164561 A1 | 5/2022 | Dai et al. | | |
| 2023/0177869 A1* | 6/2023 | Liptrot | ................ | G06V 40/1324 |
| | | | | 382/124 |
| 2024/0027262 A1* | 1/2024 | Sharma | ................ | G01J 1/0411 |

FOREIGN PATENT DOCUMENTS

| | | | | |
|---|---|---|---|---|
| CN | 110720106 A | | 1/2020 | |
| CN | 111108511 A | * | 5/2020 | ......... G06K 9/00046 |
| CN | 111325193 A | * | 6/2020 | ........... G06K 9/0004 |
| CN | 212112505 U | | 12/2020 | |
| CN | 112380964 A | | 2/2021 | |
| CN | 112466921 A | | 3/2021 | |
| CN | 112699761 A | | 4/2021 | |
| CN | 112864182 A | * | 5/2021 | ......... G06K 9/00046 |
| WO | 2019/035629 A1 | | 2/2019 | |
| WO | WO-2021035714 A1 | * | 3/2021 | ......... G02B 27/0018 |

\* cited by examiner

TEXTURE RECOGNITION DEVICE AND DISPLAY APPARATUS

TECHNICAL FIELD

Embodiments of the present disclosure relate to a texture recognition device and a display apparatus.

BACKGROUND

Because of the uniqueness of skin textures such as fingerprint patterns or palm print patterns, fingerprint recognition technology combined with optical imaging is gradually adopted by mobile electronic devices for identity verification, electronic payment, etc. At present, display screens of electronic products, such as mobile phones and tablet computers, are developing towards large screen and full screen, and in this regard, how to design a more optimized texture recognition device and improve the texture recognition texture experience of users are focus problems in the art.

SUMMARY

At least one embodiment of the present disclosure provides a texture recognition device, the texture recognition device has a plurality of pixel units and comprises a base substrate, a driving circuit layer, a photosensitive element layer, and a lens layer. The driving circuit layer is on the base substrate, the photosensitive element layer is on the base substrate, and the lens layer is on a side of the photosensitive element layer away from the base substrate, at least one pixel unit of the plurality of pixel units comprises a pixel driving circuit in the driving circuit layer, a plurality of photosensitive elements in the photosensitive element layer and a plurality of lens units in the lens layer, the pixel driving circuit is electrically connected with the plurality of photosensitive elements to drive the plurality of photosensitive elements, and in a direction perpendicular to a surface of the base substrate, the plurality of photosensitive elements are in one-to-one correspondence with and overlap with the plurality of lens units.

For example, in the texture recognition device provided by at least one embodiment of the present disclosure, the plurality of photosensitive elements comprised in the at least one pixel unit are arranged in an N*M array, M is a positive integer greater than or equal to 1, and N is a positive integer greater than 1.

For example, in the texture recognition device provided by at least one embodiment of the present disclosure, the M is equal to 2, the N is equal to 2, and the plurality of photosensitive elements comprised in the at least one pixel unit are arranged in a 2*2 array.

For example, the texture recognition device provided by at least one embodiment of the present disclosure further comprises at least one diaphragm layer, the at least one diaphragm layer comprises a first diaphragm layer, the first diaphragm layer is between the photosensitive element layer and the lens layer and comprises a plurality of first light transmission openings, in the direction perpendicular to the surface of the base substrate, the plurality of first light transmission openings are in one-to-one correspondence with and at least partially overlap with the plurality of photosensitive elements.

For example, in the texture recognition device provided by at least one embodiment of the present disclosure, a diameter of each of the plurality of first light transmission openings in a direction parallel to the surface of the base substrate is represented by D1, and 2 µm≤D1≤50 µm.

For example, in the texture recognition device provided by at least one embodiment of the present disclosure, a material of the first diaphragm layer is a light-absorbing material.

For example, in the texture recognition device provided by at least one embodiment of the present disclosure, in the direction perpendicular to the surface of the base substrate, a thickness of the first diaphragm layer ranges from 1 µm to 3 µm, and a distance between the first diaphragm layer and the photosensitive element layer ranges from 5 µm to 20 µm.

For example, in the texture recognition device provided by at least one embodiment of the present disclosure, the at least one diaphragm layer further comprises a second diaphragm layer, wherein the second diaphragm layer is between the first diaphragm layer and the lens layer and comprises a plurality of second light transmission openings, in the direction perpendicular to the surface of the base substrate, the second light transmission openings are in one-to-one correspondence with and at least partially overlap with the plurality of photosensitive elements.

For example, in the texture recognition device provided by at least one embodiment of the present disclosure, in a direction parallel to the surface of the base substrate, a diameter of each of the plurality of first light transmission openings is represented by D1, and a diameter of each of the plurality of second light transmission openings is represented by D2, and 2 µm≤D1≤D2≤50 µm.

For example, in the texture recognition device provided by at least one embodiment of the present disclosure, in the direction perpendicular to the surface of the base substrate, a thickness of the second diaphragm layer ranges from 1 µm to 3 µm, and a distance between the second diaphragm layer and the first diaphragm layer ranges from 5 µm to 20 µm.

For example, the texture recognition device provided by at least one embodiment of the present disclosure further comprises an optical filter layer between the photosensitive element layer and the first diaphragm layer, the optical filter layer is configured to filter out light with a wavelength ranging from 580 nm to 850 nm.

For example, the texture recognition device provided by at least one embodiment of the present disclosure further comprises a visual field diaphragm layer between the photosensitive element layer and the optical filter layer, the visual field diaphragm layer comprises a plurality of third light transmission openings, in the direction perpendicular to the surface of the base substrate, the plurality of third light transmission openings are in one-to-one correspondence with and at least partially overlap with the plurality of photosensitive elements.

For example, in the texture recognition device provided by at least one embodiment of the present disclosure, in a direction parallel to the surface of the base substrate, a diameter of each of the plurality of third light transmission openings is represented by D3, and 2 µm≤D3≤10 µm.

For example, in the texture recognition device provided by at least one embodiment of the present disclosure, in the direction perpendicular to the surface of the base substrate, a thickness of the visual field diaphragm layer ranges from 300 nm to 500 nm.

For example, in the texture recognition device provided by at least one embodiment of the present disclosure, a material of the visual field diaphragm layer comprises a metal material.

For example, in the texture recognition device provided by at least one embodiment of the present disclosure, for one lens unit of the plurality of lens units, one first light transmission opening of the plurality of first light transmission openings, one second light transmission opening of the plurality of second light transmission openings and one third light transmission opening of the plurality of third light transmission openings that correspond to a same photosensitive element of the plurality of photosensitive elements in the direction perpendicular to the surface of the base substrate, an orthographic projection of a center of the one lens unit on the base substrate overlaps with an orthographic projection of a center of the one first light transmission opening on the base substrate, overlaps with an orthographic projection of a center of the one second light transmission opening on the base substrate, and overlaps with an orthographic projection of a center of the one third light transmission opening on the base substrate.

For example, in the texture recognition device provided by at least one embodiment of the present disclosure, an included angle between light, which passes through an edge of the lens unit and is incident into the lens unit along the direction perpendicular to the surface of the base substrate, and a normal line, at a position on which the light is incident, of a surface of the lens unit away from the base substrate is represented by θ1, and the light is refracted by the lens unit and then enters a middle portion of a corresponding third light transmission opening, an included angle between the light refracted by the lens unit and the normal line is represented by θ2, an included angle between the light refracted by the lens unit and the direction perpendicular to the surface of the base substrate is represented by θ3, a refractive index of air is represented by n1, a refractive index of the lens unit is represented by n2, a distance between a surface of the lens unit close to the base substrate and a surface of the second diaphragm layer away from the base substrate is represented by h1, a distance between a surface of the second diaphragm layer close to the base substrate and a surface of the first diaphragm layer away from the base substrate is represented by h2, a distance between a surface of the first diaphragm layer close to the base substrate and a surface of the visual field diaphragm layer away from the base substrate is represented by h3, and a distance between the surface of the lens unit close to the base substrate and a surface of the visual field diaphragm layer close to the base substrate is represented by h4, and $n1*\sin θ1 = n2*\sin θ2;$ $D1 = (h4 - h1 - h2)*\tan θ3*2.$ For example, in the texture recognition device provided by at least one embodiment of the present disclosure, $D2 = (h4 - h1)*\tan θ3*2.$ For example, in the texture recognition device provided by at least one embodiment of the present disclosure, an included angle between light, which passes through an edge of the lens unit and is incident into the lens unit at an angle of less than 90 degrees with the direction perpendicular to the surface of the base substrate, and a normal line, at a position on which the light is incident, of the surface of the lens unit away from the base substrate is represented by θ4, and the light is refracted by the lens unit and then enters an edge of the corresponding third light transmission opening, and an included angle between the light refracted by the lens unit and the normal line is represented by θ5, an included angle between the light refracted by the lens unit and the direction perpendicular to the surface of the base substrate is represented by θ6, a diameter of the lens unit is represented by D0, and $n1*\sin θ4 = n2*\sin θ5;$ $D3 = (h4*\tan θ6 - D0/2)*2.$ For example, in the texture recognition device provided by at least one embodiment of the present disclosure, for one lens unit of the plurality of lens units, one first light transmission opening of the plurality of first light transmission openings, one second light transmission opening of the plurality of second light transmission openings and one third light transmission opening of the plurality of third light transmission openings that correspond to a same photosensitive element of the plurality of photosensitive elements in the direction perpendicular to the surface of the base substrate, an orthographic projection of a center of the one lens unit on the base substrate does not overlap with an orthographic projection of a center of the one first light transmission opening on the base substrate, does not overlap with an orthographic projection of a center of the one second light transmission opening on the base substrate, and does not overlap with an orthographic projection of a center of the one third light transmission opening on the base substrate.

For example, in the texture recognition device provided by at least one embodiment of the present disclosure, a distance between the orthographic projection of the center of the one first light transmission opening on the base substrate and the orthographic projection of the center of the one second light transmission opening on the base substrate ranges from 1 μm to 5 μm; a distance between the orthographic projection of the center of the one first light transmission opening on the base substrate and the orthographic projection of the center of the one third light transmission opening on the base substrate ranges from 1 μm to 5 μm.

For example, in the texture recognition device provided by at least one embodiment of the present disclosure, an included angle between light, which passes through a first edge of the lens unit and is incident into the lens unit at a first angle with the direction perpendicular to the surface of the base substrate, and a normal line, at a position on which the light is incident, of the surface of the lens unit away from the base substrate is represented by θ11, and the light is refracted by the lens unit and then enters a middle portion of a corresponding third light transmission opening, and an included angle between the light refracted by the lens unit and the normal line is represented by θ12, an included angle between the light refracted by the lens unit and the direction perpendicular to the surface of the base substrate is represented by θ13, an included angle between light, which passes through a second edge opposite to the first edge of the lens unit and is incident into the lens unit at the first angle with the direction perpendicular to the surface of the base substrate, and a normal line, at a position on which the light is incident, of the surface of the lens unit away from the base substrate is represented by θ14, and the light is refracted by the lens unit and then enters the middle portion of the corresponding third light transmission opening, and an included angle between the light refracted by the lens unit and the normal line is represented by θ15, an included angle between the light refracted by the lens unit and the direction perpendicular to the surface of the base substrate is represented by θ16, a refractive index of air is represented by n1, a refractive index of the lens unit is represented by n2, a distance between a surface of the lens unit close to the base substrate and a surface of the second diaphragm layer away from the base substrate is represented by h1, a distance between a surface of the second diaphragm layer close to the base substrate and a surface of the first diaphragm layer away from the base substrate is represented by h2, a distance between the surface of the first diaphragm layer close to the base substrate and a surface of the visual field diaphragm layer away from the base substrate is represented by h3, and a distance between the surface of the lens unit close to the base substrate and a surface of the visual field diaphragm layer close to the base substrate is represented by h4, a diameter of the lens unit is represented by D0, and $n1*\sin θ11=n2*\sin θ12;$ $n1*\sin θ14=n2*\sin θ15;$ $D1=D0-(h1+h2)*\tan θ13-(h1+h2)*\tan θ16.$ For example, in the texture recognition device provided by at least one embodiment of the present disclosure, $D2=D0-h1*\tan θ13-h1*\tan θ16$.

For example, in the texture recognition device provided by at least one embodiment of the present disclosure, light, which passes through the first edge of the lens unit and is incident into the lens unit at a second angle with the direction perpendicular to the surface of the base substrate, enters an edge of the corresponding third light transmission opening after being refracted by the lens unit, and an included angle between the light refracted by the lens unit and the direction perpendicular to the surface of the base substrate is represented by θ17, the second angle is larger than the first angle, light, which passes through the second edge opposite to the first edge of the lens unit and is incident into the lens unit at the second angle with the direction perpendicular to the surface of the base substrate, enters an edge of the corresponding third light transmission opening after being refracted by the lens unit, and an included angle between the light refracted by the lens unit and the direction perpendicular to the surface of the base substrate is represented by θ18, and $D3=h4*(\tan θ17+\tan θ18)-D0.$ For example, the texture recognition device provided by at least one embodiment of the present disclosure further comprises a planarization layer on a side of the lens layer away from the base substrate, a refractive index of a material of the planarization layer ranges from 1.35 to 1.45.

For example, in the texture recognition device provided by at least one embodiment of the present disclosure, each of the plurality of lens units has a curvature radius ranging from 5 μm to 20 μm and a diameter ranging from 25 μm to 35 μm.

For example, in the texture recognition device provided by at least one embodiment of the present disclosure, a shape of each of the plurality of lens units is substantially circular, square or rectangular.

For example, in the texture recognition device provided by at least one embodiment of the present disclosure, a refractive index of a material of the lens layer ranges from 1.6 to 1.7.

At least one embodiment of the present disclosure provides a display apparatus, the display apparatus comprises a display panel and the texture recognition device provided by the embodiments of the present disclosure, the display panel has a display side and a non-display side and allows light to be transmitted from the display side to the non-display side, and the texture recognition device is on the non-display side of the display panel and configured to be capable of receiving the light transmitted from the display side to the non-display side for texture recognition, the lens layer is closer to the display panel than the photosensitive element layer.

BRIEF DESCRIPTION OF THE DRAWINGS

In order to clearly illustrate technical solutions of the embodiments of the disclosure, the drawings of the embodiments will be briefly described in the following; it is obvious that the described drawings are only related to some embodiments of the disclosure and thus are not limitative of the present disclosure.

DETAILED DESCRIPTION

Figure 1:
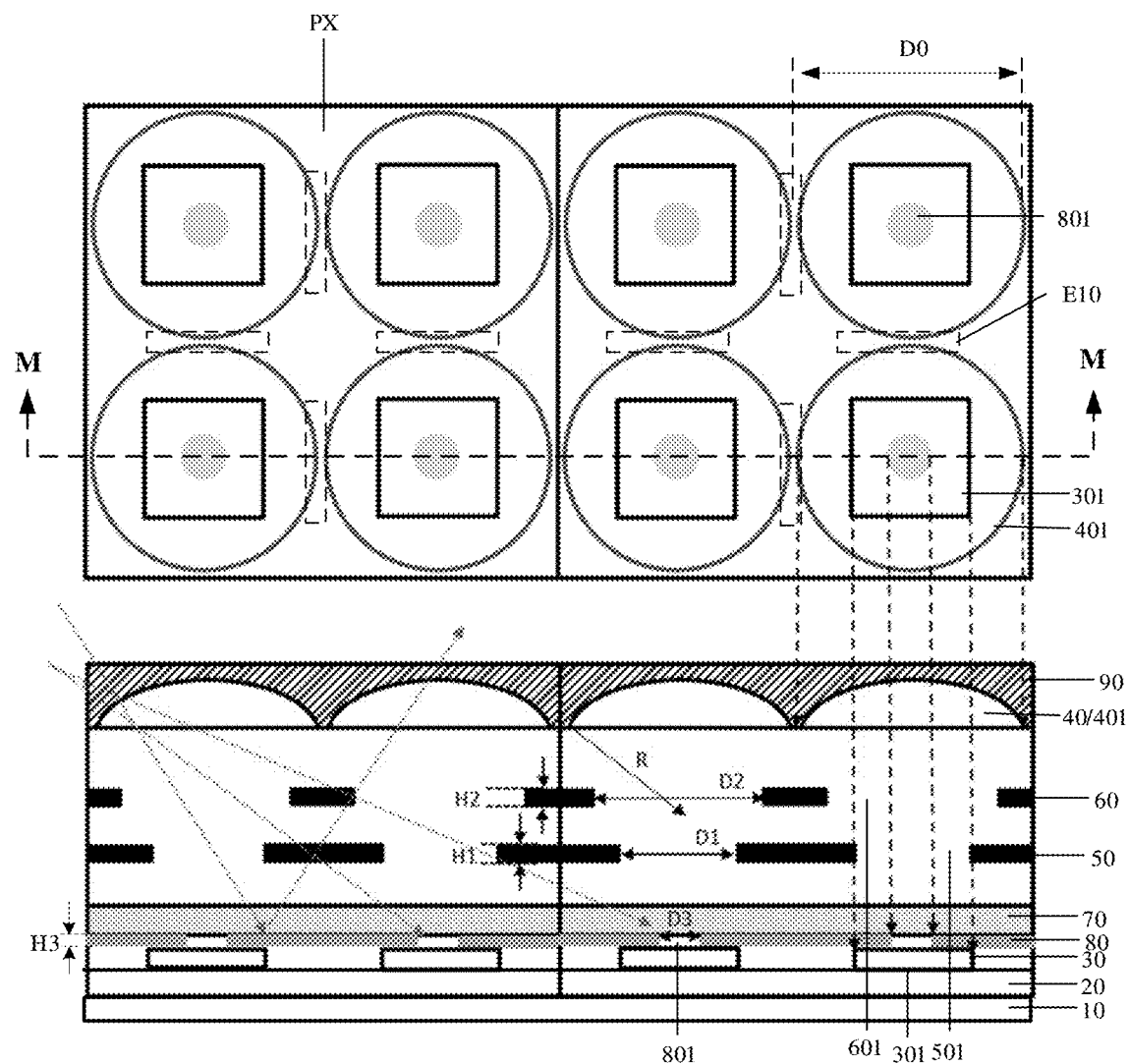
FIG. 1 is a schematic planar view of a texture recognition device provided by at least one embodiment of the present disclosure and a schematic cross-sectional view taken along the line M-M in the schematic planar view.

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment (s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may comprise an electrical connection, directly or indirectly. "On," "under," "left," "right" and the like are only used to indicate relative position relationship, and when the position of the object which is described is changed, the relative position relationship may be changed accordingly.

In a display apparatus, a texture recognition device may be arranged on the non-display side of the display panel, and the display panel can at least partially transmit light, so that the texture recognition device can receive signal light through the display panel, thus the display apparatus has both display function and texture recognition function. In the current display apparatus, the texture recognition device usually has a plurality of pixel units for recognizing signal light and generating texture images. The plurality of pixel units can respectively adopt a collimating film material with a micro-lens structure as a light path system to collimate light entering the texture recognition device, so that the collimated light can be more easily recognized and the light utilization rate can be improved. For example, each pixel unit includes a photosensitive element, and the photosensitive element is correspondingly provided with a micro-lens structure, so that the micro-lens structure can be used to collimate the light incident on the photosensitive element.

However, the inventor(s) of the present disclosure found that due to the limitation of the structure and process of the collimating film material, the light collimated by the micro-lens structure is prone to crosstalk between adjacent pixel units, which makes the collimating film material affect the light signal of the specific scene texture at a certain angle; on the other hand, because the optical clear adhesive (OCA glue) is usually used in the texture recognition device for adhesion of various structures, there is air in a part of structures of the texture recognition device, and therefore the part of structures is easy to deform after reliability test or other test experiments, resulting in attenuation of the optical signal incident into the texture recognition device, which makes the texture recognition device unable to recognize or recognize inaccurately.

At least one embodiment of the present disclosure provides a texture recognition device and a display apparatus, the texture recognition device has a plurality of pixel units, and comprises a base substrate, a driving circuit layer, a photosensitive element layer, and a lens layer. The driving circuit layer is on the base substrate, the photosensitive element layer is on the base substrate, and the lens layer is on a side of the photosensitive element layer away from the base substrate; at least one pixel unit of the plurality of pixel units comprises a pixel driving circuit in the driving circuit layer, a plurality of photosensitive elements in the photosensitive element layer and a plurality of lens units in the lens layer, the pixel driving circuit is electrically connected with the plurality of photosensitive elements to drive the plurality of photosensitive elements, and in a direction perpendicular to a surface of the base substrate, the plurality of photosensitive elements are in one-to-one correspondence with and overlap with the plurality of lens units.

In the texture recognition device provided by the embodiments of the present disclosure, at least one pixel unit includes a plurality of photosensitive elements, the plurality of photosensitive elements are driven by the same pixel driving circuit, so as to be in the same working state, and the at least one pixel unit can receive enough signal light through the plurality of photosensitive elements and synthesize texture images; on the other hand, the plurality of photosensitive elements are respectively provided with corresponding lens units, so that each lens unit can collimate the light for one photosensitive element corresponding to the each lens unit more accurately, thereby controlling the propagation direction of signal light injected into each photosensitive element more accurately, avoiding adverse phenomena such as crosstalk between adjacent pixel units, and improving the texture recognition effect of the texture recognition device.

In the following, the texture recognition device and the display apparatus provided by at least one embodiment of the present disclosure are described in detail by several specific embodiments.

FIG. 1 is a schematic planar view of a texture recognition device provided by at least one embodiment of the present disclosure and a schematic cross-sectional view taken along the line M-M in the schematic planar view, FIG. 1 shows the corresponding relationship between the above schematic planar view and schematic cross-sectional view. As shown in FIG. 1, this texture recognition device has a plurality of pixel units PX (two pixel units PX are shown as an example in the figure), and includes a base substrate 10, a driving circuit layer 20, a photosensitive element layer 30, and a lens layer 40.

For example, as shown in FIG. 1, the driving circuit layer 20 is disposed on the base substrate 10, and the photosensitive element layer 30 is disposed on the base substrate 10, FIG. 1 shows the case that the photosensitive element layer 30 is disposed on the side of the driving circuit layer 20 away from the base substrate 10. For example, in other embodiments, the photosensitive element layer 30 may also be disposed on the side of the driving circuit layer 20 close to the base substrate 10 or in the same layer as the driving circuit layer 20, as long as the driving circuit layer 20 does not affect the photosensitive effect of the photosensitive element layer 30.

For example, the lens layer 40 is disposed on the side of the photosensitive element layer 30 away from the base substrate 10, and at least one pixel unit PX of the plurality of pixel units PX includes a pixel driving circuit (described in detail later) disposed in the driving circuit layer 20, a plurality of photosensitive elements 301 disposed in the photosensitive element layer 30 (four photosensitive elements 301 are shown in FIG. 1 as an example), and a plurality of lens units 401 disposed in the lens layer 40 (four lens units 401 are shown in FIG. 1 as an example), the pixel driving circuit is electrically connected with the plurality of photosensitive elements 301 to drive the plurality of photosensitive elements 301. In a direction perpendicular to a surface of the base substrate 10, that is, the vertical direction shown in FIG. 1, the plurality of photosensitive elements 301 are in one-to-one correspondence with and overlap with the plurality of lens units 401.

Therefore, in the texture recognition device provided by embodiments of the present disclosure, the plurality of photosensitive elements included in the at least one pixel unit are electrically connected to the same pixel driving circuit, so that the plurality of photosensitive elements can be driven by the same pixel driving circuit to be in the same working state, and the pixel unit can receive enough signal light through the plurality of photosensitive elements and synthesize texture images; on the other hand, the plurality of photosensitive elements are respectively provided with corresponding lens units, so that each lens unit can more accurately collimate the light for one corresponding photosensitive element, thereby controlling the propagation direction of signal light incident into each photosensitive element more accurately, avoiding adverse phenomena such as crosstalk between adjacent pixel units, improving the light utilization rate, and further improving the texture recognition effect of the texture recognition device.

For example, in some embodiments, the plurality of photosensitive elements 301 included in the at least one pixel unit PX are arranged in an array of N*M, M is a positive integer greater than or equal to 1, and N is a positive integer greater than 1, and M and N may be the same or different. For example, in some examples, the plurality of photosensitive elements 301 are arranged in a 2*2 array (i.e., both M and N are equal to 2, as shown in FIG. 1), a 3*3 array, a 4*4 array or a 2*3 array, etc.

For example, each photosensitive element 301 is in an island shape, and a planar shape of each photosensitive element 301 in the direction parallel to the surface of the base substrate 10 may be square, rectangular, etc. For example, in the case where the planar shape of the photosensitive element 301 is square, the side length of the square may be in a range of 10 μm~20 μm, such as 12 μm, 15 μm, or 18 μm and so on.

For example, in the embodiments of the present disclosure, the photosensitive element 301 may be a photodiode, for example, the photodiode may be of a PN type or a PIN type, etc. For example, in the case where the photodiode is of the PN type, the photosensitive element 301 includes a P-type semiconductor layer and an N-type semiconductor layer that are stacked; in the case where the photodiode is of the PIN type, the photosensitive element 301 includes a P-type semiconductor layer, an intrinsic semiconductor layer and an N-type semiconductor layer that are stacked. For example, a semiconductor material adopted by the photosensitive element 301 may be silicon, germanium, selenium, gallium arsenide, etc., and the embodiments of the present disclosure are not limited in this aspect.

For example, in some embodiments, as shown in FIG. 1, the planar shape of each of the plurality of lens units 401 may be circular. In this case, the curvature radius R of each lens unit 401 may range from 5 μm to 20 μm, such as 7 μm, 10 μm or 15 μm and so on, and the diameter D0 of each lens unit 401 may range from 25 μm to 35 μm, such as 27 μm, 30 μm or 32 μm, and so on.

Figure 3:
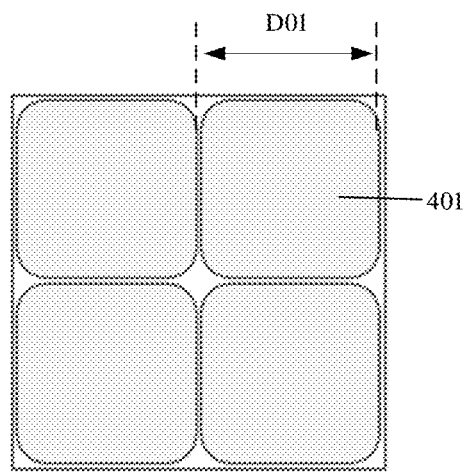
FIG. 3 is a schematic planar view of a plurality of lens units in a texture recognition device provided by at least one embodiment of the present disclosure.

For example, in other embodiments, the planar shape of each of the plurality of lens units 401 may also be rectangular or square. For example, FIG. 3 shows another schematic planar view of the plurality of lens units. As shown in FIG. 3, in this example, the planar shape of each of the plurality of lens units 401 is a rounded rectangle. In this case, the curvature radius R of each lens unit 401 may range from 5 μm to 20 μm, such as 7 μm, 10 μm or 15 μm and so on, and the side length D01 of each lens unit 401 may range from 25 μm to 35 μm, such as 27 μm, 30 μm or 32 μm and so on.

For example, in some embodiments, the refractive index of a material of the lens layer 40 may be in a range of 1.6~1.7, such as 1.65 and so on. Therefore, the plurality of lens units 401 can fully refract light incident therein, thereby achieving an effective collimation effect and improving the utilization rate of the incident light.

For example, as shown in FIG. 1, in some embodiments, the texture recognition device may further include a first diaphragm layer 50, the first diaphragm layer 50 is disposed between the photosensitive element layer 30 and the lens layer 40 and includes a plurality of first light transmission openings 501. In the direction perpendicular to the surface of the base substrate 10, the plurality of first light transmission openings 501 are in one-to-one correspondence with and at least partially overlap with the plurality of photosensitive elements 301. The plurality of first light transmission openings 501 are respectively configured to transmit signal light incident on the plurality of photosensitive elements 301, and blocking unnecessary light such as light at a certain angle (light at a large angle with the surface of the base substrate) and signal light used for adjacent photosensitive elements, such as the light indicated by the dotted line in FIG. 1, so as to further prevent undesirable phenomena such as signal crosstalk.

Figure 2:
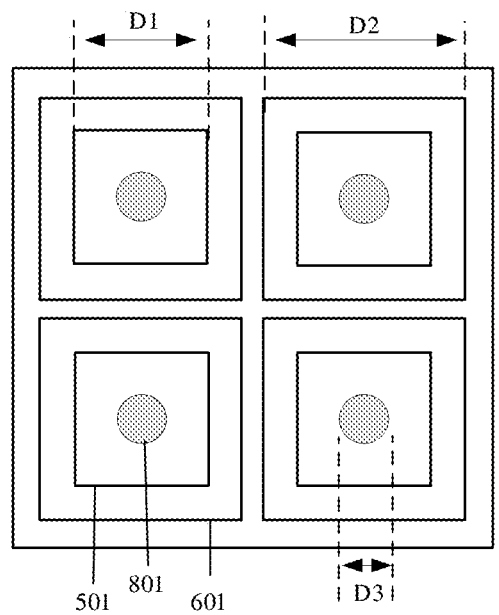
FIG. 2 is a schematic planar view of a first diaphragm layer, a second diaphragm layer and a visual field diaphragm layer in a texture recognition device provided by at least one embodiment of the present disclosure.

For clarity and conciseness of illustration, the planar view of FIG. 1 does not show the planar view of the plurality of first light transmission openings 501 of the first diaphragm layer 50, and FIG. 2 shows the planar view of the plurality of first light transmission openings 501 of the first diaphragm layer 50 in the texture recognition device provided by at least one embodiment of the present disclosure.

For example, as shown in FIG. 1 and FIG. 2, in some embodiments, in the direction parallel to the surface of the base substrate 10, that is, in the horizontal direction shown in FIG. 1, the diameter of each first light transmission opening 501 is represented by D1, and 2 μm≤D1≤50 μm, for example, D1 is 10 μm, 20 μm or 30 μm, and so on.

For example, in the direction parallel to the surface of the base substrate 10, the shape of each of the plurality of first light transmission openings 501 may be rectangular, square or circular. As shown in FIG. 1, in the case where the shape of each of the plurality of first light transmission openings 501 is square, the above D1 may be the side length of the square; in other examples, in the case where the shape of each of the plurality of first light transmission openings 501 is rectangular, the above D1 may be the diagonal length of the rectangle; in the case where the shape of each of the plurality of first light transmission openings 501 is circular, the above D1 may be the diameter of the circle.

For example, in some embodiments, a material of the first diaphragm layer 50 may be a light-absorbing material, such as a material of a black matrix, such as a black light-absorbing material formed by adding a black dye to a resin material, so that the reflection of light by the first diaphragm layer 50 can be reduced or even eliminated, thereby preventing the reflected light from having an adverse effect on texture recognition. For example, the plurality of first light transmission openings 501 are filled with a transparent resin material, so as to prevent undesirable phenomena such as deformation inside the texture recognition device caused by air gaps existing in the texture recognition device.

For example, in some embodiments, as shown in FIG. 1, in the direction perpendicular to the surface of the base substrate 10, that is, in the vertical direction shown in FIG. 1, the thickness H1 of the first diaphragm layer 50 is in a range of 1 µm~3 µm, such as 1.5 µm, 2 µm or 2.5 µm and so on, and the distance between the first diaphragm layer 50 and the photosensitive element layer 30 is in a range of 5 µm~20 µm, that is, the distance between the lower surface of the first diaphragm layer 50 and the upper surface of the photosensitive element layer 30 is in a range of 5 µm~20 µm, such as 10 µm, 15 µm or 18 µm and so on. With the above configuration, the first diaphragm layer 50 can effectively realize the crosstalk prevention function.

For example, in some embodiments, as shown in FIG. 1 and FIG. 2, the texture recognition device may further include a second diaphragm layer 60, and the second diaphragm layer 60 is disposed between the first diaphragm layer 50 and the lens layer 40 and includes a plurality of second light transmission openings 601. In the direction perpendicular to the surface of the base substrate 10, the plurality of second light transmission openings 601 are in one-to-one correspondence with and at least partially overlap with the plurality of photosensitive elements 301. The plurality of second light transmission openings 601 are respectively configured to transmit signal light incident on the plurality of photosensitive elements 301, and blocking unnecessary light such as light at a certain angle (light at a large angle with the surface of the base substrate) and signal light used for adjacent photosensitive elements, such as the light indicated by the dotted line in FIG. 1, so that adverse phenomena such as signal crosstalk can be further prevented.

For example, as shown in FIG. 1 and FIG. 2, in the direction parallel to the surface of the base substrate 10, the diameter of each second light transmission opening 601 is represented by D2, and 2 µm≤D1≤D2≤50 µm, for example, D2 may be 20 µm, 30 µm or 40 µm and so on.

Similarly, in the direction parallel to the surface of the base substrate 10, the shape of each second light transmission opening 601 may be rectangular, square or circular. As shown in FIG. 1, in the case where the shape of each of the plurality of second light transmission openings 601 is square, the above-mentioned D2 may be the side length of the square; in other examples, in the case where the shape of the second light transmission opening 601 is rectangular, the above-mentioned D2 may be the diagonal length of the rectangle; and in the case where the shape of the second light transmission opening 601 is circular, the above D2 may be the diameter of the circle.

For example, in some embodiments, a material of the second diaphragm layer 60 may be a light-absorbing material, such as a material of a black matrix, such as a black light-absorbing material formed by adding a black dye to a resin material, so that the reflection of light by the second diaphragm layer 60 can be reduced or even eliminated, thereby avoiding the influence of the reflected light on texture recognition. For example, the plurality of second light transmission openings 601 are filled with a transparent resin material, so as to prevent undesirable phenomena such as deformation inside the texture recognition device caused by air gaps existing in the texture recognition device.

For example, in some embodiments, in the direction perpendicular to the surface of the base substrate 10, the thickness H2 of the second diaphragm layer 60 is in a range of 1 µm~3 µm, such as 1.5 µm, 2 µm or 2.5 µm, and so on, and the distance between the second diaphragm layer 60 and the first diaphragm layer 50 is in a range of 5 µm~20 µm, such as 10 µm, 15 µm or 18 µm, and so on.

In the process of texture recognition, besides the signal light used for texture recognition, the photosensitive element 301 may further sense ambient light incident through the finger. Because the photosensitive element 301 receives light passively, the photosensitive element 301 cannot actively distinguish the signal light from the ambient light, therefore the ambient light may interfere with the texture recognition of the photosensitive element 301. For example, in the case where the ambient light shines directly above the finger, the ambient light can penetrate the finger and excite the biological tissues in the finger to emit pigment light, which may interfere with fingerprint recognition. It is determined by detection that the pigment light mainly includes light with a wavelength in a range of 580 nm~850 nm.

For example, in some embodiments, as shown in FIG. 1, the texture recognition device may further include a light filter layer 70 disposed between the photosensitive element layer 30 and the first diaphragm layer 50. The light filter layer 70 is configured to filter out light with a wavelength in a range of 580 nm~850 nm, that is, not allow light with the wavelength in the range of 580 nm~850 nm to transmit, so as to prevent the pigment light from affecting texture recognition, and in this way, the texture recognition device can be used in outdoor scenes. For example, the optical filter layer 70 can further be configured to have a high transmittance for signal light that is used for texture recognition. For example, the optical filter layer 70 is configured to have a high transmittance for visible light with a wavelength in a range of 400 nm~560 nm, so that the photosensitive element 301 can fully receive the signal light. For example, in some embodiments, the optical filter layer 70 is a green photoresist layer.

For example, in some embodiments, transparent resin materials are filled between the optical filter layer 70 and the first diaphragm layer 50, between the first diaphragm layer 50 and the second diaphragm layer 60, and between the second diaphragm layer 60 and the lens layer 40 to ensure the distance between different structures, which does not affect the propagation of signal light.

For example, in some embodiments, as shown in FIG. 1 and FIG. 2, the texture recognition device may further include a visual field diaphragm layer 80 disposed between the photosensitive element layer 30 and the optical filter layer 70, and the visual field diaphragm layer 80 includes a plurality of third light transmission openings 801, in the direction perpendicular to the surface of the base substrate 10, the plurality of third light transmission openings 801 are in one-to-one correspondence with and at least partially overlap with the plurality of photosensitive elements 301. The plurality of third light transmission openings 801 are respectively configured to transmit the signal light incident on the plurality of photosensitive elements 301, and block unnecessary light with a large angle (light at a large angle with the surface of the base substrate), such as the light indicated by the dotted line in FIG. 1, so as to further prevent signal crosstalk and other undesirable phenomena.

For example, as shown in FIG. 1 and FIG. 2, in the direction parallel to the surface of the base substrate 10, the diameter of each third light transmission opening 801 is represented by D3, and 2 µm≤D3≤10 µm, for example, D3 is 5 µm, 7 µm or 9 µm, and so on.

For example, in some embodiments, as shown in FIG. 1, in the direction perpendicular to the surface of the base substrate 10, the thickness H3 of the visual field diaphragm layer 80 is in a range of 300 nm~500 nm, such as 350 nm, 400 nm or 450 nm and so on.

For example, in some embodiments, a material of the visual field diaphragm layer 80 includes a metal material, such as molybdenum, aluminum, titanium or other metal materials or alloy materials thereof. In this case, in the manufacturing process of the texture recognition device, the visual field diaphragm layer 80 can be formed together in the manufacturing process of the driving circuit layer 20 and the photosensitive element layer 30, thus simplifying the manufacturing process of the texture recognition device.

It is proved by test that under the above configuration, the texture recognition device shown in FIG. 1 can effectively transmit signal light, and effectively avoid the influence of unnecessary light on texture recognition. For example, by testing the light incident on the texture recognition device, it can be concluded that the texture recognition device can effectively block the unnecessary light incident on the texture recognition device with a wavelength in a range of 400 nm~850 nm, and the transmittance of the unnecessary light is less than 1%, which can fully meet the requirements of the texture recognition device.

For example, in some embodiments, as shown in FIG. 1, the texture recognition device may further include a planarization layer 90 arranged on the side of the lens layer 30 away from the base substrate 10, the planarization layer 90 can planarize the unevenness caused by the lens layer 30, and is beneficial to connecting the texture recognition device to other devices, such as a display panel, etc., by the planarization layer 90. For example, in some examples, the planarization layer 90 may be bonded to a display panel by optical clear adhesive. In this case, because the planarization layer 90 is relatively flat, the optical clear adhesive has stronger adhesion to the planarization layer 90 and the display panel.

For example, in some embodiments, the refractive index of a material of the planarization layer 90 is in a range of 1.35~1.45, such as 1.40. For example, the planarization layer 90 includes an organic material with a refractive index in a range of 1.35~1.45. In the embodiments of the present disclosure, the planarization layer 90 is formed by using a material with a low refractive index, which can avoid adverse effects caused by the planarization layer 90 on the propagation of signal light, such as unnecessary refraction and reflection that occur on signal light.

For example, in some embodiments, as shown in FIG. 1 and FIG. 2, for one first light transmission opening 501, one second light transmission opening 601 and one third light transmission opening 801 that correspond to the same photosensitive element 301 in the direction perpendicular to the surface of the base substrate 10, an orthographic projection of a center of the first light transmission opening 501 on the base substrate 10 overlaps with an orthographic projection of a center of the second light transmission opening 601 on the base substrate 10. For example, the orthographic projection of the center of the first light transmission opening 501 on the base substrate 10 also overlap with an orthographic projection of a center of the third light transmission opening 801 on the base substrate 10. For example, the orthographic projection of the center of the first light transmission opening 501 on the base substrate 10 also overlap with an orthographic projection of a center of the photosensitive element 301 on the base substrate 10.

Figure 4A:
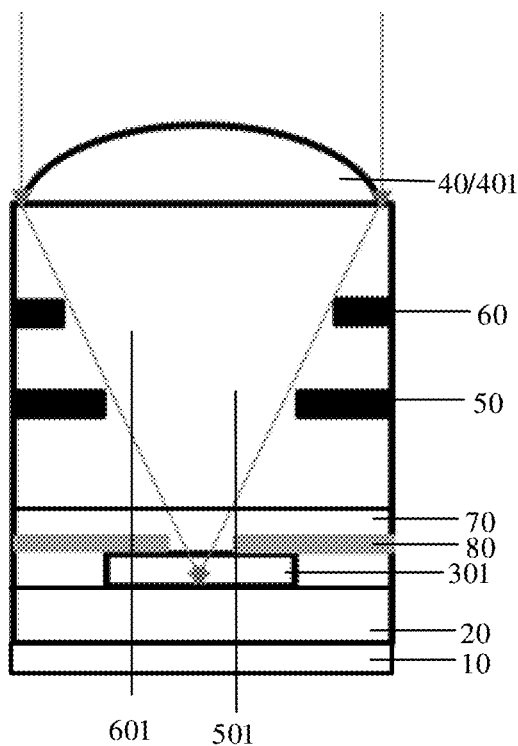
FIG. 4A is a schematic diagram of a propagation path of signal light in the texture recognition device of FIG. 1 and FIG. 2.

For example, FIG. 4A shows a schematic diagram of a propagation path of signal light in the texture recognition device shown in FIG. 1 and FIG. 2. As shown in FIG. 4A, the signal light used for texture recognition is incident on the photosensitive element 301 sequentially through the second light transmission opening 601, the first light transmission opening 501 and the third light transmission opening 801, and the signal light incident on the photosensitive element 301 from all directions has similar angular ranges.

Figure 4B:
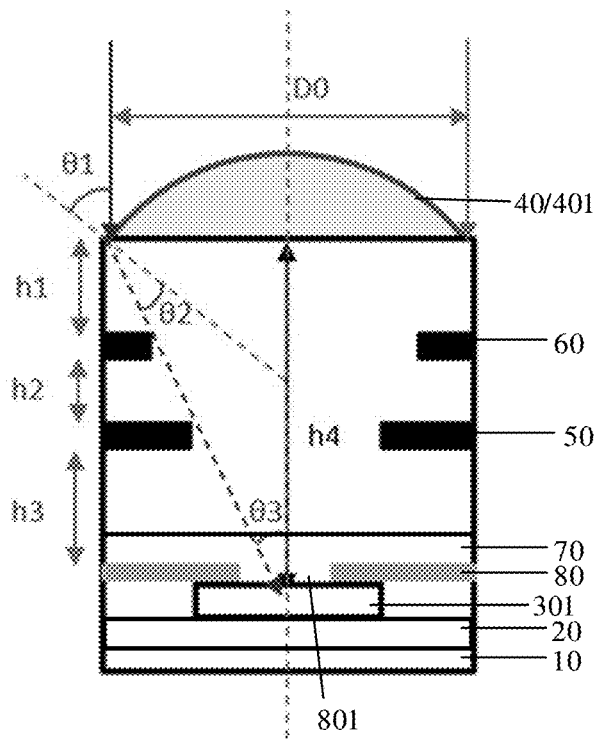
FIG. 4B is another schematic diagram of a propagation path of signal light in a texture recognition device provided by at least one embodiment of the present disclosure.

FIG. 4B shows another schematic diagram of a propagation path of signal light in the texture recognition device shown in FIG. 1 and FIG. 2. As shown in FIG. 4B, an included angle between light, which passes through an edge of the lens unit 401 and is incident into the lens unit 401 along the direction perpendicular to the surface of the base substrate 10, and a normal line, at a position on which the light is incident, of a surface of the lens unit 401 away from the base substrate 10 is represented by θ1, and the light is refracted by the lens unit 401 and then enters the a middle portion of the corresponding third light transmission opening 801, an included angle between the light refracted by the lens unit 401 and the normal line is represented by θ2, an included angle between the light refracted by the lens unit 401 and the direction perpendicular to the surface of the base substrate 10 is represented by θ3, a refractive index of air is represented by n1, a refractive index of the lens unit is represented by n2. The distance between a surface of the lens unit 401 close to the base substrate 10 and a surface of the second diaphragm layer 60 away from the base substrate 10 is represented by h1, a distance between a surface of the second diaphragm layer 60 close to the base substrate 10 and a surface of the first diaphragm layer 50 away from the base substrate 10 is represented by h2, a distance between a surface of the first diaphragm layer 50 close to the base substrate 10 and a surface of the visual field diaphragm layer 80 away from the base substrate 10 is represented by h3, and a distance between the surface of the lens unit 401 close to the base substrate 10 and a surface of the visual field diaphragm layer 80 close to the base substrate 10 is represented by h4, and n1*sin θ1=n2*sin θ2;

$$D1=(h4-h1-h2)*\tan \theta 3*2;$$

$$D2=(h4-h1)*\tan \theta 3*2.$$

Figure 4C:
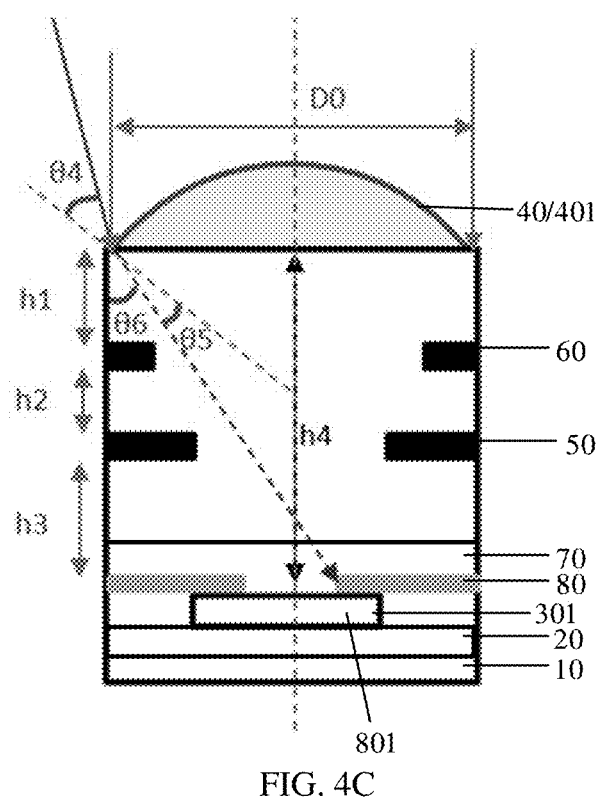
FIG. 4C is further another schematic diagram of a propagation path of signal light in a texture recognition device provided by at least one embodiment of the present disclosure.

FIG. 4C is further another schematic diagram of a propagation path of signal light in the texture recognition device shown in FIG. 1 and FIG. 2. As shown in FIG. 4C, an included angle between light, which passes through the edge of the lens unit 401 and is incident into the lens unit 401 at an angle of less than 90 degrees (e.g. 3 degrees~10 degrees.) with the direction perpendicular to the surface of the base substrate 10 (i.e. the vertical direction in the figure), and a normal line, at a position on which the light is incident, of the surface of the lens unit 401 away from the base substrate 10 is represented by θ4, and the light is refracted by the lens unit 401 and then enters an edge of the corresponding third light transmission opening 801, and an included angle between the light refracted by the lens unit 401 and the normal line is represented by θ5, an included angle between the light refracted by the lens unit 401 and the direction perpendicular to the surface of the base substrate 10 is represented by θ6, the diameter of the lens unit 401 is represented by D0, and $$n1*\sin \theta 4=n2*\sin \theta 5;$$

$$D3=(h4*\tan \theta 6-D0/2)*2.$$

Figure 5:
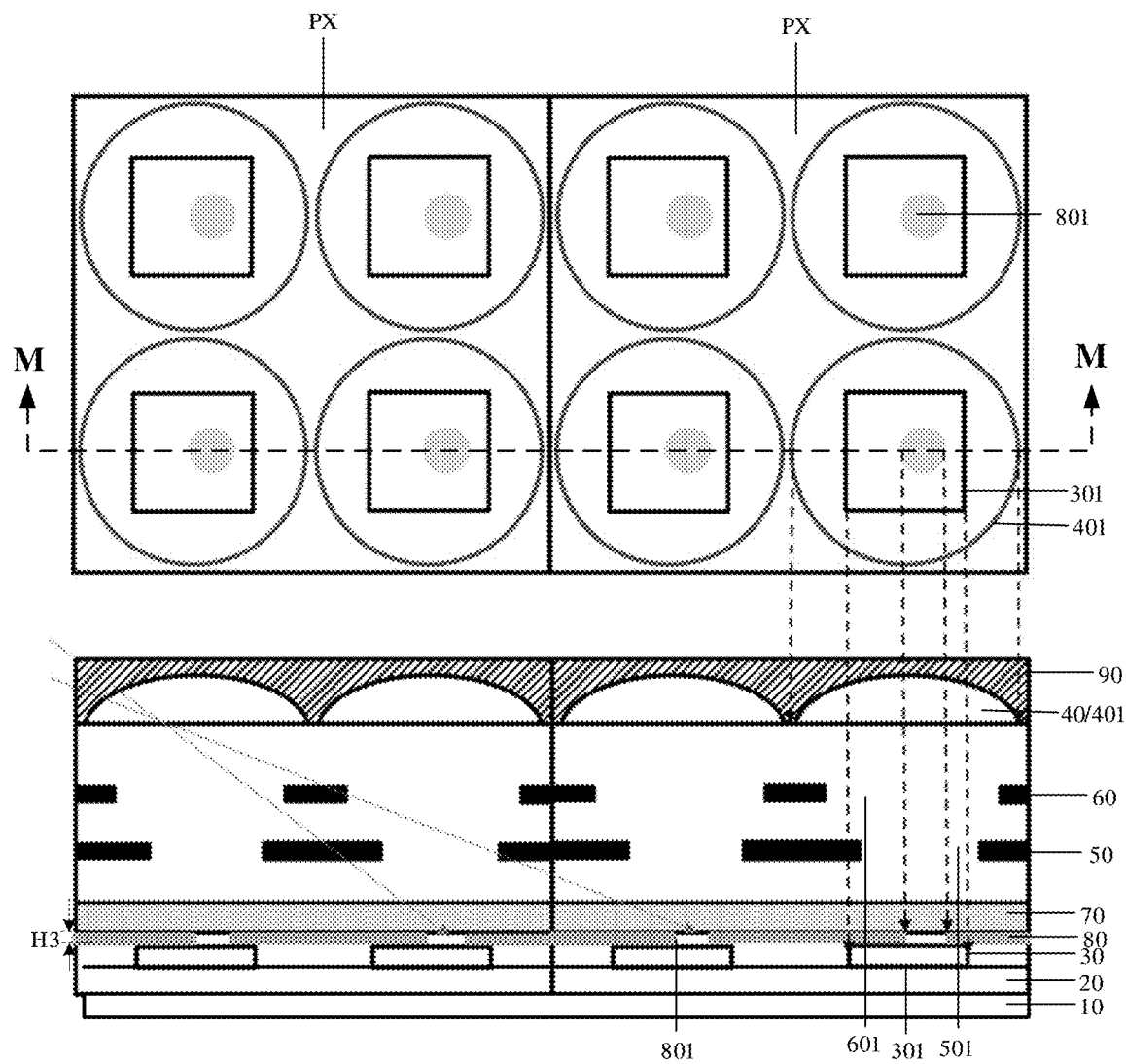
FIG. 5 is a schematic planar view of another texture recognition device provided by at least one embodiment of the present disclosure and a schematic cross-sectional view taken along the line M-M in the above schematic planar view.
Figure 6:
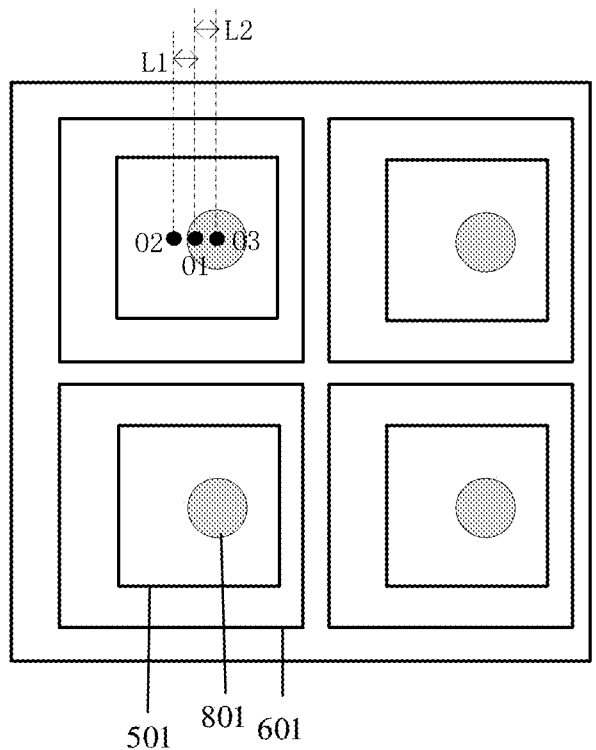
FIG. 6 is another schematic planar view of a first diaphragm layer, a second diaphragm layer and a visual field diaphragm layer in a texture recognition device provided by at least one embodiment of the present disclosure.

For example, in other embodiments, FIG. 5 shows a schematic planar view and a schematic cross-sectional view of another texture recognition device, FIG. 6 shows a schematic planar view of the first light transmission openings, the second light transmission openings and the third light transmission openings in the texture recognition device shown in FIG. 5, and FIGS. 7A-7C show schematic diagrams of propagation paths of signal light in the texture recognition device in FIG. 5 and FIG. 6.

Different from the embodiment shown in FIG. 1-FIG. 4C, in the embodiment shown in FIG. 5-FIG. 7C, for one first light transmission opening 501, one second light transmission opening 601 and one third light transmission opening 801 that correspond to the same photosensitive element 301 in the direction perpendicular to the surface of the base substrate 10, the orthographic projection of the center of the first light transmission opening 501 on the base substrate 10 does not overlap with the orthographic projection of the center of the second light transmission opening 601 on the base substrate 10. The orthographic projection of the center of the first transparent opening 501 on the base substrate 10 does not overlap with the orthographic projection of the center of the third transparent opening 801 on the base substrate 10. The orthographic projection of the center of the second light transmission opening 601 on the base substrate 10 does not overlap with the orthographic projection of the center of the third light transmission opening 801 on the base substrate 10. For example, the orthographic projection of the center of the third light transmission opening 801 on the base substrate 10 does not overlap with the orthographic projection of the center of the photosensitive element 301 on the base substrate 10.

Figure 7A:
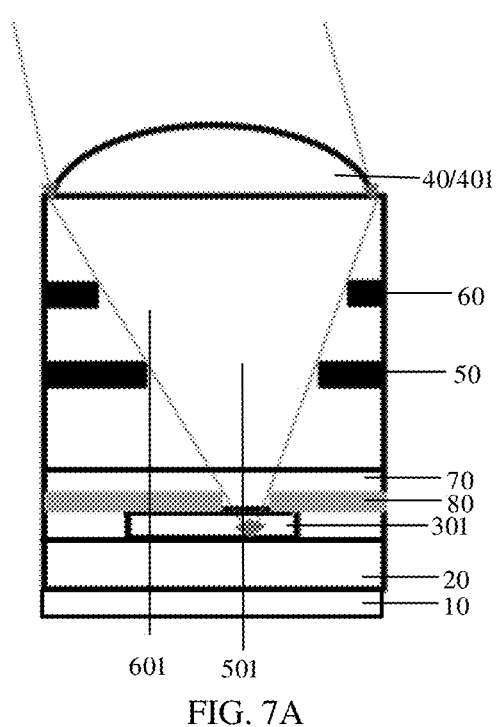
FIG. 7A is a schematic diagram of a propagation path of signal light in the texture recognition device in FIG. 5 and FIG. 6.
Figure 7B:
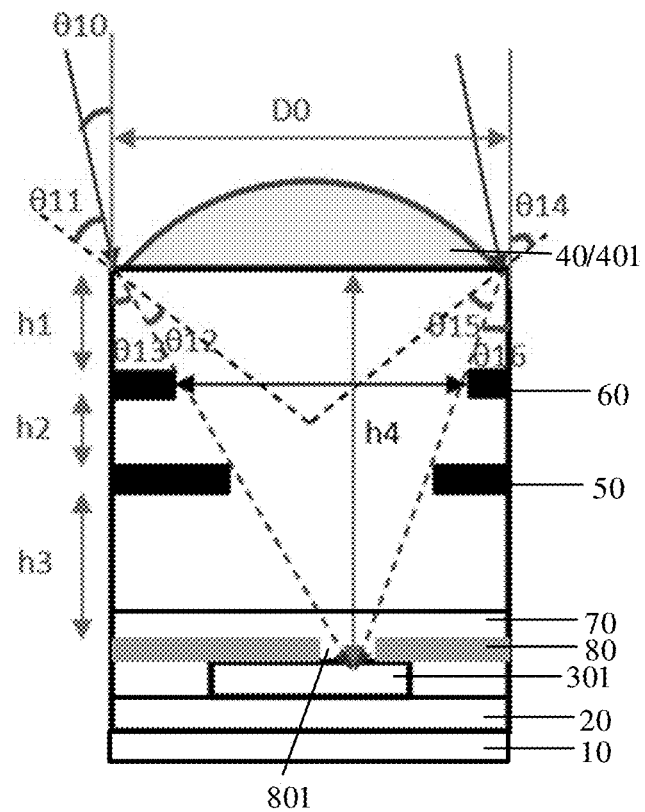
FIG. 7B is another schematic diagram of a propagation path of signal light in the texture recognition device in FIG. 5 and FIG. 6.

For example, as shown in FIG. 7B, an included angle between light, which passes through a first edge (the left edge of the lens unit in the figure) of the lens unit 401 and is incident into the lens unit 401 at a first angle θ10 with the direction perpendicular to the surface of the base substrate 10, and a normal line, at a position on which the light is incident, of the surface of the lens unit 401 away from the base substrate 10 is represented by θ11, and the light is refracted by the lens unit 401 and then enters the middle portion of the corresponding third light transmission opening 801, and an included angle between the light refracted by the lens unit 401 and the normal line is represented by θ12, an included angle between the light refracted by the lens unit 401 and the direction perpendicular to the surface of the base substrate 10 is represented by θ13, an included angle between light, which passes through a second edge (the right edge of the lens unit in the figure) opposite to the first edge of the lens unit 401 and is incident into the lens unit 401 at the first angle θ10 with the direction perpendicular to the surface of the base substrate 10, and a normal line, at a position on which the light is incident, of the surface of the lens unit 401 away from the base substrate 10 is represented by θ14, and the light is refracted by the lens unit 401 and then enters the middle portion of the corresponding third light transmission opening 801, and an included angle between the light refracted by the lens unit 401 and the normal line is represented by θ15, an included angle between the light refracted by the lens unit 401 and the direction perpendicular to the surface of the base substrate 10 is represented by θ16, and $$n1 * \sin θ11 = n2 * \sin θ12;$$

$$n1 * \sin θ14 = n2 * \sin θ15;$$

$$D1 = D0 - (h1+h2) * \tan θ13 - (h1+h2) * \tan θ16;$$

$$D2 = D0 - h1 * \tan θ13 - h1 * \tan θ16.$$

Figure 7C:
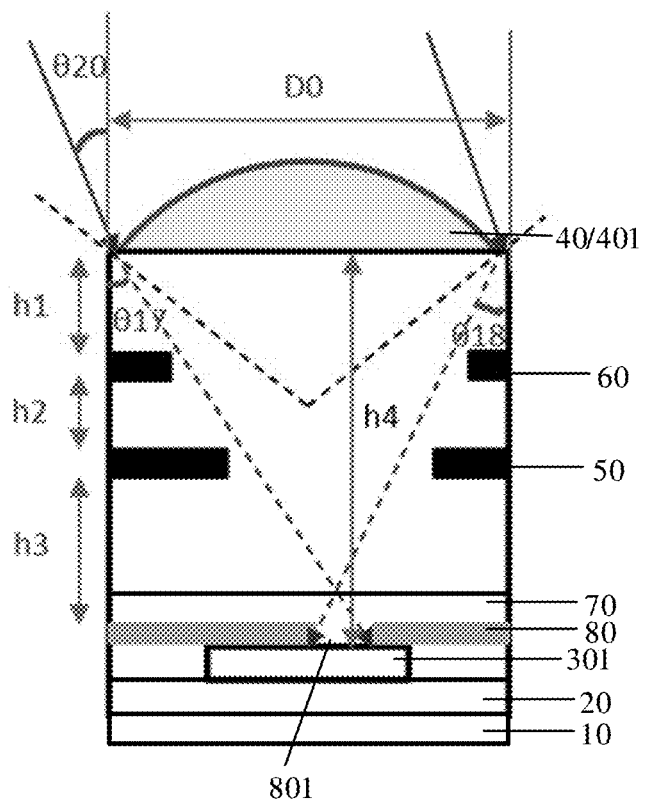
FIG. 7C is further another schematic diagram of a propagation path of signal light in the texture recognition device in FIG. 5 and FIG. 6.

For example, as shown in FIG. 7C, light, which passes through the first edge (the left edge of the lens unit in the figure) of the lens unit 401 and is incident into the lens unit 401 at a second angle θ20 with the direction perpendicular to the surface of the base substrate 10, enters the edge of the corresponding third light transmission opening 801 after being refracted by the lens unit 401, and an included angle between the light refracted by the lens unit 401 and the direction perpendicular to the surface of the base substrate 10 is represented by θ17. The second angle θ20 is larger than the first angle θ10, for example, the second angle θ20 is in a range of 5 degrees~15 degrees, and the first angle θ10 is in a range of 3 degrees~10 degrees. Light, which passes through the second edge (the right edge of the lens unit in the figure) opposite to the first edge of the lens unit 401 and is incident into the lens unit 401 at the second angle θ20 with the direction perpendicular to the surface of the base substrate 10, enters the edge of the corresponding third light transmission opening 801 after being refracted by the lens unit 401, and an included angle between the light refracted by the lens unit 401 and the direction perpendicular to the surface of the base substrate 10 is represented by θ18, and $$D3 = h4 * (\tan θ17 + \tan θ18) - D0.$$

For example, in some examples, as shown in FIG. 6, the orthographic projection of the center of the first light transmission opening 501 on the base substrate 10 is represented by O1, and the orthographic projection of the center of the second light transmission opening 601 on the base substrate 10 is represented by O2, and the distance L1 between O1 and O2 is in a range of 1 μm~5 μm, such as 2 μm, 3 μm or 4 μm, and so on.

For example, the orthographic projection of the center of the third light transmission opening 801 on the base substrate 10 is represented by O3, and the distance L2 between the orthographic projection O1 of the center of the first light transmission opening 501 on the base substrate 10 and the orthographic projection O3 of the center of the third light transmission opening 801 on the base substrate 10 is in a range of 1 μm~5 μm, such as 2 μm, 3 μm or 4 μm, and so on. Therefore, as shown in FIG. 7, the signal light at a certain angle with the surface of the base substrate 10 can be incident into the photosensitive element 301 sequentially through the second light transmission opening 601, the first light transmission opening 501 and the third light transmission opening 801, so that the texture recognition device can select the light incident on the texture recognition device at a specific angle to perform texture recognition by configuring the distances between O1, O2 and O3.

Figure 8:
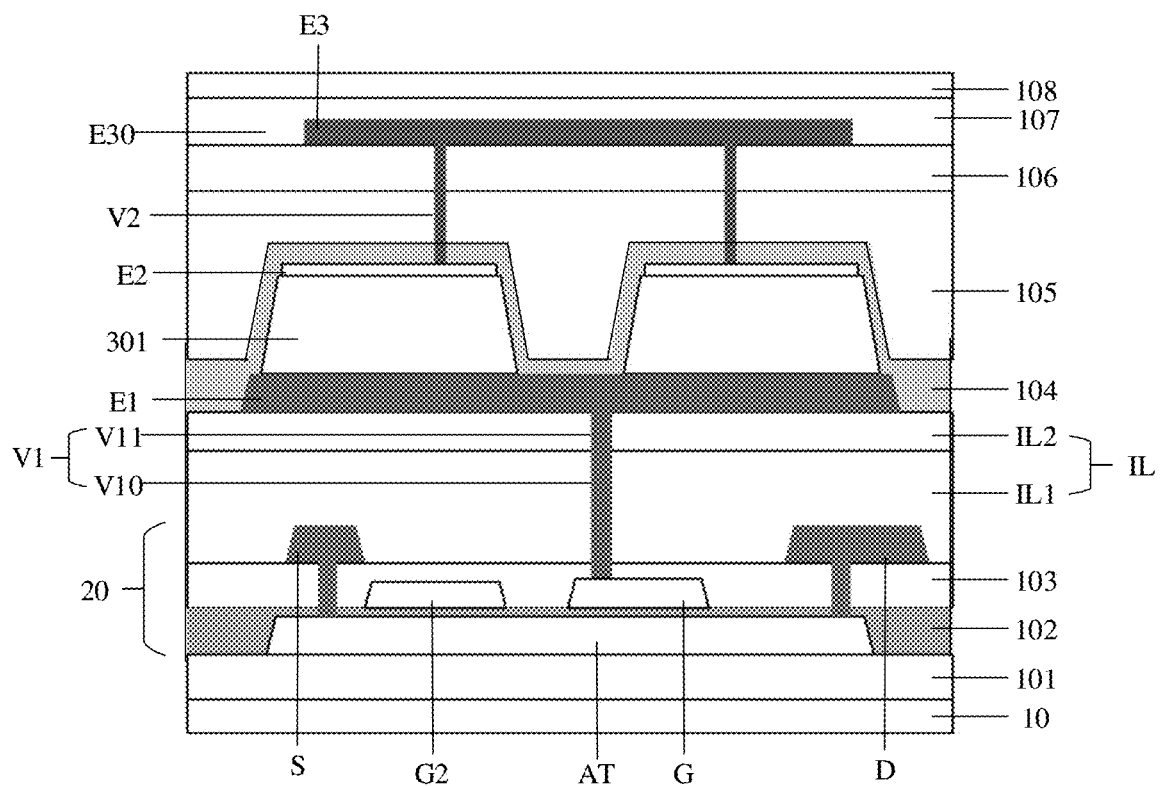
FIG. 8 is a schematic cross-sectional view of a driving circuit layer and a photosensitive element layer in a texture recognition device provided by at least one embodiment of the present disclosure.
Figure 9:
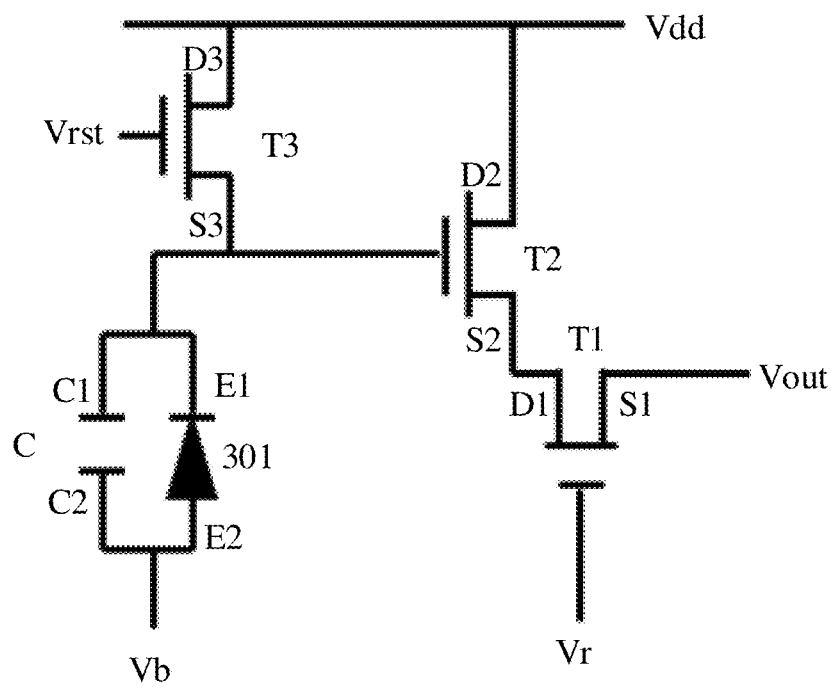
FIG. 9 is a circuit diagram of a pixel driving circuit and a photosensitive element in a texture recognition device provided in at least one embodiment of the present disclosure.

For example, FIG. 8 is a schematic cross-sectional view of a driving circuit layer and a photosensitive element layer in a texture recognition device provided by at least one embodiment of the present disclosure, FIG. 9 is a circuit diagram of a pixel driving circuit and a photosensitive element in a texture recognition device provided by at least one embodiment of the present disclosure.

For example, the plurality of photosensitive elements included in each pixel unit PX are arranged on one same first electrode E1, so as to be connected to the same pixel driving circuit through the same first electrode E1. In this case, the first electrode E1 may be electrically connected with the pixel driving circuit through a via (i.e., one via V1 in the figure) to realize the electrical connection between the plurality of photosensitive elements P and the same pixel driving circuit, thereby reducing the number of via V1 for electrical connection, facilitating the selection of the location of the via V1, and further facilitating the flatness of the pixel driving circuit. On the other hand, the plurality of photosensitive elements P included in the at least one pixel unit PX are driven by the same pixel driving circuit, so as to be in the same working state, and the pixel unit PX can receive enough signal light through the plurality of photosensitive elements P and synthesize texture images.

For example, the pixel driving circuit of each pixel unit PX includes at least one thin film transistor, and may further include structures such as a capacitor, and so on. As shown in FIG. 8 and FIG. 9, in this example, the pixel driving circuit includes a first thin film transistor T1, a second thin film transistor T2, a third thin film transistor T3 and a capacitor C, and so on.

For example, as shown in FIG. 9, the first thin film transistor T1 acts as a switch transistor, the control terminal of the first thin film transistor T1 is connected to the signal scanning line Vr, and the first source-drain terminal S1 and the second source-drain terminal D1 of the first thin film transistor T1 are respectively connected to the signal reading line Vout and the first source-drain terminal S2 of the second thin film transistor T2. The second thin film transistor T2 acts as a driving transistor, the control terminal of the second thin film transistor T2 is connected to the first source-drain terminal S3 of the third thin film transistor T3, the first capacitor plate C1 of the capacitor C and the first electrode E1 of the photosensitive element 301, and the second source-drain terminal D2 of the second thin film transistor T2 is connected to the power supply line Vdd. The third thin film transistor T3 acts as a reset transistor, the control terminal of the third thin film transistor T3 is connected to the reset signal line Vrst, and the second source-drain terminal D3 of the third thin film transistor T3 is connected to the power supply line Vdd. The second capacitor plate C2 of the capacitor C and the second electrode E2 of the photosensitive element 301 are connected to the voltage bias line Vb.

For example, under the circuit shown in FIG. 9, the working process of the photosensitive element 301 includes the following processes. First, in a reset stage, a reset signal is input to the control terminal of the third thin film transistor T3 through the reset signal line Vrst to turn on the third thin film transistor T3, and the reset signal is written into the first electrode E1 of the photosensitive element 301 and the control terminal of the second thin film transistor T2; then, in a photosensitive stage, the photosensitive element 301 generates photo-generated carriers to generate photo-generated leakage current under irradiation of the signal light, and charges the capacitor C, so that the capacitor C generates and stores electrical signals; finally, in a detection stage, a scanning signal is input to the control terminal of the first thin film transistor T1 through the signal scanning line Vr to turn on the first thin film transistor T1, and a texture recognition chip reads the electrical signals stored by the capacitor C from the first thin film transistor T1 and the second thin film transistor T2 through the signal reading line Vout, and then a texture image is formed.

For example, in FIG. 8, only one thin film transistor is shown, for example, the thin film transistor shown in FIG. 8 is the second thin film transistor T2 mentioned above, and includes structures such as an active layer AT, a gate electrode G, a source electrode S and a drain electrode D. For example, the gate electrode G serves as the control terminal of the second thin film transistor T2, the source electrode S serves as the first source-drain terminal of the second thin film transistor T2, and the drain electrode D serves as the second source-drain terminal of the second thin film transistor T2. For example, another gate electrode G2 is shown in FIG. 2, the gate electrode G2 is the gate electrode of the first thin film transistor T1. Other structures of the first thin film transistor T1 and the third thin film transistor T3 are not shown in FIG. 2. For example, the first thin film transistor T1 and the third thin film transistor T3 have structures similar to those of the second thin film transistor T2, and the specific structures of the first thin film transistor T1, the second thin film transistor T2 and the third thin film transistor T3 are not limited in the embodiments of the present disclosure.

For example, in some embodiments, as shown in FIG. 8, the texture recognition device further includes an interlayer insulation layer IL, the interlayer insulation layer IL is disposed between the driving circuit layer 20 and the first electrode layer, and the interlayer insulation layer IL includes the via V1, the first electrode E1 is electrically connected to the pixel driving circuit through the via V1, for example, the first electrode E1 is electrically connected to the gate electrode G of the second thin film transistor T2 in the pixel driving circuit. For example, an orthographic projection of the via V1 on the base substrate 10 does not overlap with the orthographic projection of the plurality of photosensitive elements 301 on the base substrate 10.

Because the position of the via V1 is uneven, by the feature that the via V1 does not overlap with the plurality of photosensitive elements 301 in the direction perpendicular to the surface of the base substrate 10, it is possible to prevent the uneven part from being arranged below the photosensitive elements 301 because arranging the uneven part below the photosensitive elements 301 can deform the structure of the photosensitive elements, thereby ensuring the structural accuracy of the photosensitive elements and improving the photosensitive effect of the photosensitive elements.

For example, in some embodiments, the interlayer insulation layer is a planarization layer for planarizing the pixel driving circuit, which is beneficial to arranging the first electrode layer on the planarization layer. For example, in some embodiments, as shown in FIG. 8, the interlayer insulation layer may include a stack of a plurality of sub-insulation layers, such as a planarization layer IL1 and a first passivation layer IL2, the planarization layer IL1 has a via V10, the first passivation layer IL2 has a via V11, and the via V10 and the via V11 are communicated to form the via V1 in the interlayer insulation layer IL. For example, in other embodiments, the interlayer insulation layer may include a stack of more sub-insulation layers. The embodiments of the present disclosure do not limit the specific form of the interlayer insulation layer IL.

For example, in some embodiments, the first electrode E1 of each pixel unit PX is in a whole piece structure arranged below the plurality of photosensitive elements; alternatively, in some other embodiments, referring to FIG. 1, the first electrode E1 includes at least one first hollow part E10 arranged between two adjacent photosensitive elements 301 of the plurality of photosensitive elements 301. For example, the first electrode E1 includes a plurality of first hollow parts E10 arranged between every adjacent two photosensitive elements 301 of the plurality of photosensitive elements 301. The first hollow part E10 can prevent the generation of coupling capacitance between the first electrode E1 and the circuit above or below the first electrode E1, so as to avoid adverse phenomena such as signal crosstalk and so on.

For example, in some embodiments, as shown in FIG. 8, the texture recognition device further includes a second electrode layer arranged on the side of the photosensitive element layer away from the base substrate 10. For example, the at least one pixel unit PX further includes a plurality of second electrodes E2 arranged in the second electrode layer, and the plurality of second electrodes E2 are respectively arranged on the side of the plurality of photosensitive elements 301 away from the base substrate 10. The first electrode E1 and the plurality of second electrodes E2 jointly drive the plurality of photosensitive elements 301; on the other hand, the first electrode E1 may constitute the above-mentioned capacitor C together with the plurality of second electrodes E2.

For example, in some embodiments, orthographic projections of the plurality of second electrodes E2 on the base substrate 10 do not overlap with the orthographic projection of the via V1 on the base substrate 10. For example, the plurality of second electrodes E2 are arranged at intervals in the second electrode layer, and an orthographic projection of the second electrode E2 arranged on each photosensitive element 301 on the base substrate 10 is located in the orthographic projection of the corresponding photosensitive element 301 on the base substrate 10, so as to ensure the flatness of the second electrode E2 and the accuracy of the transmission of electrical signals by the second electrode E2.

For example, in some embodiments, as shown in FIG. 8, the texture recognition device may further include a third electrode layer E3, the third electrode layer E3 is arranged on the side of the second electrode layer away from the base substrate 10, and the plurality of second electrodes E2 are electrically connected with the third electrode layer E3. For example, the third electrode layer E3 is connected to the voltage bias line VB, so that each second electrode E2 obtains the same electrical signal from the voltage bias line VB through the third electrode layer E3.

For example, in some embodiments, the third electrode layer E3 includes at least one second hollow portion E30 disposed between two adjacent pixel units PX of the plurality of pixel units PX. For example, the third electrode layer E3 includes a plurality of second hollow parts E30 arranged between every adjacent two pixel units PX of the plurality of pixel units PX. The second hollow part E30 can prevent the third electrode layer E3 from generating coupling capacitance with the circuit above or below the third electrode layer E3, so as to avoid adverse phenomena such as signal crosstalk and so on.

For example, as shown in FIG. 8, the texture recognition device may further include a first buffer layer 101 disposed on the base substrate 10, a first gate insulation layer 102 disposed on the active layer AT, a second gate insulation layer 103 disposed on the gate electrode G, a second buffer layer 104 disposed on the second electrode layer, an organic insulation layer 105 disposed on the second buffer layer 104, a second passivation layer 106 disposed on the organic insulation layer 105, and a third passivation layer 107 disposed on the third electrode layer E3. For example, a plurality of vias V2 are provided in the second buffer layer 104, the organic insulation layer 105, and the second passivation layer 106, and the plurality of second electrodes E2 are respectively connected to the third electrode layer E3 through the plurality of vias V2.

For example, in some embodiments, as shown in FIG. 8, the texture recognition device may further include an electrostatic shielding layer 108, the electrostatic shielding layer 108 is disposed on the side of the third electrode layer E3 away from the base substrate 10, and an orthographic projection of the third electrode layer E3 on the base substrate 10 is located in an orthographic projection of the electrostatic shielding layer 108 on the base substrate 10. The electrostatic shielding layer 108 can play a role of providing electrostatic shielding for the third electrode layer E3 and the circuit below the third electrode layer E3.

For example, in some embodiments, as shown in FIG. 8, the electrostatic shielding layer 108 may be a whole piece formed on the third electrode layer E3, or have the same pattern as the third electrode layer E3. For example, the electrostatic shielding layer 108 may have a third hollow part between adjacent pixel units PX, and the third hollow part is not shown in the figure.

For example, the visual field diaphragm layer 80 is disposed on the side of the electrostatic shielding layer 108 away from the base substrate 10, and an insulation adhesive layer may be provided between the visual field diaphragm layer 80 and the electrostatic shielding layer 108.

For example, in the embodiments of the present disclosure, the base substrate 10 may include a flexible insulation material such as polyimide (PI) or a rigid insulation material such as a glass substrate. For example, the first buffer layer 101 and the second buffer layer 104 may include an inorganic material such as silicon nitride, silicon oxide, silicon oxynitride, and so on. The active layer AT may be made of polysilicon or metal oxide or other materials. The first gate insulation layer 101 and the second gate insulation layer 103 may be made of an inorganic insulation material such as silicon oxide, silicon nitride, silicon oxynitride, and so on. The gate electrode G may be made of a metal material such as copper, aluminum, titanium and cobalt, and so on, for example, the gate electrode G may be formed into a single-layer structure or a multi-layer structure such as a multi-layer structure of titanium/aluminum/titanium or molybdenum/aluminum/molybdenum. The first passivation layer IL2, the second passivation layer 106 and the third passivation layer 107 may be made of an inorganic insulation material such as silicon oxide, silicon nitride, silicon oxynitride, and so on. The source-drain electrode S/D may be made of copper, aluminum, titanium, cobalt or other metal materials. For example, the source-drain electrode S/D may be formed into a single-layer structure or a multi-layer structure such as a titanium/aluminum/titanium multi-layer structure, a molybdenum/aluminum/molybdenum multi-layer structure or other multi-layer structures. The first electrode layer includes, for example, a metal oxide such as ITO, IZO and so on or a metal such as Ag, Al and Mo or alloys thereof. The second electrode layer, the third electrode layer and the electrostatic shielding layer 108 include, for example, a transparent metal oxide such as ITO, IZO and so on. The planarization layer IL1 may be made of an organic insulation material such as polyimide and so on. The embodiments of the present disclosure do not specifically limit the material of each functional layer.

For example, the texture recognition device provided by the embodiments of the present disclosure may further include other structures, which can be referred to relevant technologies for details, and are not repeated here.

Figure 10:
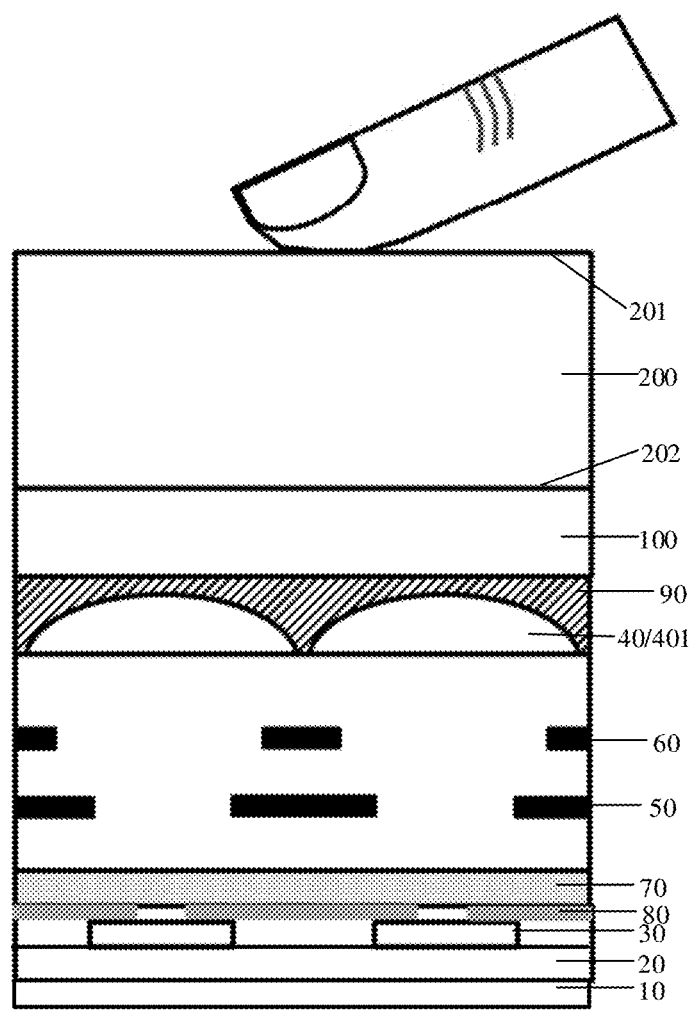
FIG. 10 is a schematic cross-sectional view of a display apparatus provided by at least one embodiment of the present disclosure.

At least one embodiment of the present disclosure further provides a display apparatus. FIG. 10 shows a schematic cross-sectional view of the display apparatus. As shown in FIG. 10, the display apparatus includes a display panel 200 and a texture recognition device provided by at least one embodiment of the present disclosure. The display panel 200 has a display side 201 and a non-display side 202, and allows light to be transmitted from the display side 201 to the non-display side 202. The texture recognition device is arranged on the non-display side 202 of the display panel 200 and is configured to receive light transmitted from the display side 201 to the non-display side 202 for texture recognition. In the case where the texture recognition device is provided, the lens layer 40 is closer to the display panel 20 relative to the photosensitive element layer 30.

The display apparatus provided by the embodiments of the present disclosure uses the texture recognition device provided by at least one embodiment of the present disclosure to perform texture recognition, and has a better texture recognition effect, for example, has a higher texture recognition speed and higher texture recognition accuracy.

The following statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and size of a layer or a structure may be enlarged or narrowed, that is, the drawings are not drawn in a real scale. However, it should be understood that, in the case where a component such as a layer, film, region, substrate or the like is referred to be "on" or "under" another component, the component may be directly on or under the another component or there may be an intermediate component.

(3) In case of no conflict, the embodiments of the present disclosure and the features in the embodiments can be combined with each other to obtain new embodiments.

What have been described above are only specific implementations of the present disclosure, the protection scope of the present disclosure is not limited thereto, and the protection scope of the present disclosure should be based on the protection scope of the claims.

What is claimed is:

1. A texture recognition device, having a plurality of pixel units and comprising:
a base substrate,
a driving circuit layer on the base substrate,
a photosensitive element layer on the base substrate, and
a lens layer on a side of the photosensitive element layer away from the base substrate,
wherein at least one pixel unit of the plurality of pixel units comprises a pixel driving circuit in the driving circuit layer, a plurality of photosensitive elements in the photosensitive element layer and a plurality of lens units in the lens layer, the pixel driving circuit is electrically connected with the plurality of photosensitive elements to drive the plurality of photosensitive elements, and in a direction perpendicular to a surface of the base substrate, the plurality of photosensitive elements are in one-to-one correspondence with and overlap with the plurality of lens units;
the texture recognition device further comprises a first diaphragm layer between the photosensitive element layer and the lens layer, a second diaphragm layer between the first diaphragm layer and the lens layer and a visual field diaphragm layer between the photosensitive element layer and the first diaphragm layer, the first diaphragm layer comprises a plurality of first light transmission openings, the second diaphragm layer comprises a plurality of second light transmission openings, and the visual field diaphragm layer comprises a plurality of third light transmission openings,
an included angle between light, which passes through an edge of the lens unit and is incident into the lens unit along the direction perpendicular to the surface of the base substrate, and a normal line, at a position on which the light is incident, of a surface of the lens unit away from the base substrate is represented by θ1, and the light is refracted by the lens unit and then enters a middle portion of a corresponding third light transmission opening, an included angle between the light refracted by the lens unit and the normal line is represented by θ2, an included angle between the light refracted by the lens unit and the direction perpendicular to the surface of the base substrate is represented by θ3, a refractive index of air is represented by n1, a refractive index of the lens unit is represented by n2, a distance between a surface of the lens unit close to the base substrate and a surface of the second diaphragm layer away from the base substrate is represented by h1, a distance between a surface of the second diaphragm layer close to the base substrate and a surface of the first diaphragm layer away from the base substrate is represented by h2, a distance between a surface of the first diaphragm layer close to the base substrate and a surface of the visual field diaphragm layer away from the base substrate is represented by h3, and a distance between the surface of the lens unit close to the base substrate and a surface of the visual field diaphragm layer close to the base substrate is represented by h4, a diameter of each of the plurality of first light transmission openings is represented by D1, and $$n1*\sin\theta1 = n2*\sin\theta2;$$

$$D1=(h4-h1-h2)*\tan\theta3*2.$$

2. The texture recognition device according to claim 1, wherein the plurality of photosensitive elements comprised in the at least one pixel unit are arranged in an N*M array, wherein M is a positive integer greater than or equal to 1, and N is a positive integer greater than 1.

3. The texture recognition device according to claim 1, wherein in the direction perpendicular to the surface of the base substrate, the plurality of first light transmission openings are in one-to-one correspondence with and at least partially overlap with the plurality of photosensitive elements.

4. The texture recognition device according to claim 3, wherein a material of the first diaphragm layer is a light-absorbing material.

5. The texture recognition device according to claim 3, wherein in the direction perpendicular to the surface of the base substrate, a thickness of the first diaphragm layer ranges from 1 μm to 3 μm, and a distance between the first diaphragm layer and the photosensitive element layer ranges from 5 μm to 20 μm;
a diameter of each of the plurality of first light transmission openings in a direction parallel to the surface of the base substrate is represented by D1, and 2 μm≤D1≤50 μm.

6. The texture recognition device according to claim 3, wherein
in the direction perpendicular to the surface of the base substrate, the second light transmission openings are in one-to-one correspondence with and at least partially overlap with the plurality of photosensitive elements.

7. The texture recognition device according to claim 6, wherein in a direction parallel to the surface of the base substrate, a diameter of each of the plurality of second light transmission openings is represented by D2, and 2 μm≤D1≤D2≤50 μm;
in the direction perpendicular to the surface of the base substrate, a thickness of the second diaphragm layer ranges from 1 μm to 3 μm, and a distance between the second diaphragm layer and the first diaphragm layer ranges from 5 µm to 20 µm.

8. The texture recognition device according to claim 6, further comprising an optical filter layer between the photosensitive element layer and the first diaphragm layer, wherein the optical filter layer is configured to filter out light with a wavelength ranging from 580 nm to 850 nm.

9. The texture recognition device according to claim 8, wherein in the direction perpendicular to the surface of the base substrate, the plurality of third light transmission openings are in one-to-one correspondence with and at least partially overlap with the plurality of photosensitive elements.

10. The texture recognition device according to claim 9, wherein in a direction parallel to the surface of the base substrate, a diameter of each of the plurality of third light transmission openings is represented by D3, and 2 µm≤D3≤10 µm;
in the direction perpendicular to the surface of the base substrate, a thickness of the visual field diaphragm layer ranges from 300 nm to 500 nm;
a material of the visual field diaphragm layer comprises a metal material.

11. The texture recognition device according to claim 9, wherein for one lens unit of the plurality of lens units, one first light transmission opening of the plurality of first light transmission openings, one second light transmission opening of the plurality of second light transmission openings and one third light transmission opening of the plurality of third light transmission openings that correspond to a same photosensitive element of the plurality of photosensitive elements in the direction perpendicular to the surface of the base substrate,
an orthographic projection of a center of the one lens unit on the base substrate overlaps with an orthographic projection of a center of the one first light transmission opening on the base substrate, overlaps with an orthographic projection of a center of the one second light transmission opening on the base substrate, and overlaps with an orthographic projection of a center of the one third light transmission opening on the base substrate.

12. The texture recognition device according to claim 1, wherein a diameter of each of the plurality of second light transmission openings is represented by D2, $D2=(h4-h1)*\tan\theta 3*2.$ 13. The texture recognition device according to claim 12, wherein an included angle between light, which passes through an edge of the lens unit and is incident into the lens unit at an angle of less than 90 degrees with the direction perpendicular to the surface of the base substrate, and a normal line, at a position on which the light is incident, of the surface of the lens unit away from the base substrate is represented by $\theta 4$, and the light is refracted by the lens unit and then enters an edge of the corresponding third light transmission opening, and an included angle between the light refracted by the lens unit and the normal line is represented by $\theta 5$, an included angle between the light refracted by the lens unit and the direction perpendicular to the surface of the base substrate is represented by $\theta 6$, a diameter of the lens unit is represented by D0, a diameter of each of the plurality of third light transmission openings is represented by D3, and $n1*\sin\theta 4 = n2*\sin\theta 5;$ $D3=(h4*\tan\theta 6-D0/2)*2.$ 14. The texture recognition device according to claim 9, wherein for one lens unit of the plurality of lens units, one first light transmission opening of the plurality of first light transmission openings, one second light transmission opening of the plurality of second light transmission openings and one third light transmission opening of the plurality of third light transmission openings that correspond to a same photosensitive element of the plurality of photosensitive elements in the direction perpendicular to the surface of the base substrate,
an orthographic projection of a center of the one lens unit on the base substrate does not overlap with an orthographic projection of a center of the one first light transmission opening on the base substrate, does not overlap with an orthographic projection of a center of the one second light transmission opening on the base substrate, and does not overlap with an orthographic projection of a center of the one third light transmission opening on the base substrate.

15. The texture recognition device according to claim 14, wherein a distance between the orthographic projection of the center of the one first light transmission opening on the base substrate and the orthographic projection of the center of the one second light transmission opening on the base substrate ranges from 1 µm to 5 µm;
a distance between the orthographic projection of the center of the one first light transmission opening on the base substrate and the orthographic projection of the center of the one third light transmission opening on the base substrate ranges from 1 µm to 5 µm.

16. The texture recognition device according to claim 1, wherein each of the plurality of lens units has a curvature radius ranging from 5 µm to 20 µm and a diameter ranging from 25 µm to 35 µm;
a shape of each of the plurality of lens units is substantially circular, square or rectangular;
a refractive index of a material of the lens layer ranges from 1.6 to 1.7.

17. A display apparatus, comprising:
a display panel, having a display side and a non-display side and allowing light to be transmitted from the display side to the non-display side, and
the texture recognition device according to claim 1, on the non-display side of the display panel and configured to be capable of receiving the light transmitted from the display side to the non-display side for texture recognition,
wherein the lens layer is closer to the display panel than the photosensitive element layer.

18. A texture recognition device, having a plurality of pixel units and comprising:
a base substrate,
a driving circuit layer on the base substrate,
a photosensitive element layer on the base substrate, and
a lens layer on a side of the photosensitive element layer away from the base substrate,
wherein at least one pixel unit of the plurality of pixel units comprises a pixel driving circuit in the driving circuit layer, a plurality of photosensitive elements in the photosensitive element layer and a plurality of lens units in the lens layer, the pixel driving circuit is electrically connected with the plurality of photosensitive elements to drive the plurality of photosensitive elements, and in a direction perpendicular to a surface of the base substrate, the plurality of photosensitive elements are in one-to-one correspondence with and overlap with the plurality of lens units;

the texture recognition device further comprises a first diaphragm layer between the photosensitive element layer and the lens layer, a second diaphragm layer between the first diaphragm layer and the lens layer and a visual field diaphragm layer between the photosensitive element layer and the first diaphragm layer, the first diaphragm layer comprises a plurality of first light transmission openings, the second diaphragm layer comprises a plurality of second light transmission openings, and the visual field diaphragm layer comprises a plurality of third light transmission openings, an included angle between light, which passes through a first edge of the lens unit and is incident into the lens unit at a first angle with the direction perpendicular to the surface of the base substrate, and a normal line, at a position on which the light is incident, of the surface of the lens unit away from the base substrate is represented by $\theta 11$, and the light is refracted by the lens unit and then enters a middle portion of a corresponding third light transmission opening, and an included angle between the light refracted by the lens unit and the normal line is represented by $\theta 12$, an included angle between the light refracted by the lens unit and the direction perpendicular to the surface of the base substrate is represented by $\theta 13$, an included angle between light, which passes through a second edge opposite to the first edge of the lens unit and is incident into the lens unit at the first angle with the direction perpendicular to the surface of the base substrate, and a normal line, at a position on which the light is incident, of the surface of the lens unit away from the base substrate is represented by $\theta 14$, and the light is refracted by the lens unit and then enters the middle portion of the corresponding third light transmission opening, and an included angle between the light refracted by the lens unit and the normal line is represented by $\theta 15$, an included angle between the light refracted by the lens unit and the direction perpendicular to the surface of the base substrate is represented by $\theta 16$, a refractive index of air is represented by n1, a refractive index of the lens unit is represented by n2, a distance between a surface of the lens unit close to the base substrate and a surface of the second diaphragm layer away from the base substrate is represented by h1, a distance between a surface of the second diaphragm layer close to the base substrate and a surface of the first diaphragm layer away from the base substrate is represented by h2, a distance between the surface of the first diaphragm layer close to the base substrate and a surface of the visual field diaphragm layer away from the base substrate is represented by h3, and a distance between the surface of the lens unit close to the base substrate and a surface of the visual field diaphragm layer close to the base substrate is represented by h4, a diameter of the lens unit is represented by D0, a diameter of each of the plurality of first light transmission openings is represented by D1, and $n1*\sin\theta 11 = n2*\sin\theta 12$;

$n1*\sin\theta 14 = n2*\sin\theta 15$;

$D1 = D0 - (h1+h2)*\tan\theta 13 - (h1+h2)*\tan\theta 16$.

19. The texture recognition device according to claim 18, wherein light, which passes through the first edge of the lens unit and is incident into the lens unit at a second angle with the direction perpendicular to the surface of the base substrate, enters an edge of the corresponding third light transmission opening after being refracted by the lens unit, and an included angle between the light refracted by the lens unit and the direction perpendicular to the surface of the base substrate is represented by $\theta 17$, the second angle is larger than the first angle, light, which passes through the second edge opposite to the first edge of the lens unit and is incident into the lens unit at the second angle with the direction perpendicular to the surface of the base substrate, enters an edge of the corresponding third light transmission opening after being refracted by the lens unit, and an included angle between the light refracted by the lens unit and the direction perpendicular to the surface of the base substrate is represented by $\theta 18$, a diameter of each of the plurality of third light transmission openings is represented by D3, and $D3 = h4*(\tan\theta 17 + \tan\theta 18) - D0$.

20. The texture recognition device according to claim 18, wherein a diameter of each of the plurality of second light transmission openings is represented by D2, and $D2 = D0 - h1*\tan\theta 13 - h1*\tan\theta 16$.

* * * * *